(12) United States Patent
Love et al.

(10) Patent No.: US 7,321,644 B2
(45) Date of Patent: Jan. 22, 2008

(54) LOW-COMPLEXITY, SYMBOL-BASED, REDUCED SUBSTREAMS MAXIMUM LIKELIHOOD DECODER AND METHOD FOR A MULTIPLE-INPUT, MULTIPLE-OUTPUT COMMUNICATION SYSTEM

(75) Inventors: David J. Love, Garland, TX (US); Srinath Hosur, Plano, TX (US); Anuj Batra, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 690 days.

(21) Appl. No.: 10/863,455

(22) Filed: Jun. 8, 2004

(65) Prior Publication Data

US 2005/0271166 A1 Dec. 8, 2005

(51) Int. Cl.
*H03D 1/00* (2006.01)
(52) U.S. Cl. ...................... 375/341; 375/342
(58) Field of Classification Search ............... 375/340, 375/341, 342, 262; 714/794, 795
See application file for complete search history.

(56) References Cited

U.S. PATENT DOCUMENTS

| | | | |
|---|---|---|---|
| 4,823,346 A | | 4/1989 | Kobayashi et al. |
| 7,012,974 B1 * | | 3/2006 | Liu et al. .................... 375/340 |
| 2004/0085890 A1 * | | 5/2004 | Love et al. .................. 370/203 |
| 2004/0192216 A1 * | | 9/2004 | Oprea .......................... 455/73 |

OTHER PUBLICATIONS

Madkour et al; Successive Interference Cancellation Algorithms for Downlink W-CDMA Communications; IEEE Transactions on Wireless Communications; vol. 1, No. 1; Jan. 2002; pp. 169-177.
Hochwald et al; Achieving Near-Capacity on a Multiple-Antenna Channel; IEEE Transactions on Communications; vol. 51, No. 3; Mar. 2003; pp. 389-399.

* cited by examiner

*Primary Examiner*—Chieh M. Fan
*Assistant Examiner*—Jaison Joseph
(74) *Attorney, Agent, or Firm*—Steven A. Shaw; W. James Brady; Frederick J. Telecky, Jr.

(57) ABSTRACT

A greater likelihood decoder, a method of deriving a reduced substreams maximum likelihood (RSML) decoded symbol vector and a multiple-input, multiple-output (MIMO) receiver incorporating the decoder or the method. In one embodiment, the decoder includes: (1) a suboptimal decoder that analyzes a received symbol vector to generate substream indicators and a decoded symbol vector estimate, (2) weakest substreams decision logic, coupled to the suboptimal decoder, that receives the substream indicators and selects weakest ones thereof and (3) subspace search logic, coupled to the suboptimal decoder and the weakest substreams decision logic, that further selects a reduced substreams maximum likelihood (RSML) decoded symbol vector from a subspace of decoded symbol vector candidates derived from the decoded symbol vector estimate and the weakest ones.

21 Claims, 2 Drawing Sheets

LOW-COMPLEXITY, SYMBOL-BASED, REDUCED SUBSTREAMS MAXIMUM LIKELIHOOD DECODER AND METHOD FOR A MULTIPLE-INPUT, MULTIPLE-OUTPUT COMMUNICATION SYSTEM

TECHNICAL FIELD OF THE INVENTION

The present invention is directed, in general, to multiple-input, multiple-output (MIMO) communication systems and, more specifically, to a greater likelihood decoder configured to provide a reduced substreams maximum likelihood (RSML) decoded symbol vector and a method of deriving the same.

BACKGROUND OF THE INVENTION

Multiple-input multiple output (MIMO) communication systems have been shown to provide improvements in capacity and reliability over single-input single-output (SISO) communication systems. MIMO communication systems commonly employ a block structure wherein a MIMO transmitter, actually a collection of single-dimension transmitters, sends a vector of symbol information. This symbol vector may represent one or more coded or uncoded SISO data symbols. The transmitted signal propagates through the channel and is received and processed by a MIMO receiver. The MIMO receiver can obtain multiple receive signals corresponding to each transmitted symbol. The performance of the entire communication system hinges on the ability of the receiver to find reliable estimates of the symbol vector that was transmitted.

For such MIMO communication systems, a receive signal may be written in the form:

$$y_k = \sum_n H_n s_{k-n} + v \quad (1)$$

where $H_n$ is an $M_r$ by $M_t$ matrix of common gains, $S_k$ is the $M_t$-dimensional symbol vector transmitted at time k and v is a $M_r$-dimensional vector of additive noise. In narrowband wireless systems, where the symbol period is much larger than the RMS delay spread or in orthogonal frequency division multiplexing (OFDM) systems (for each frequency bin) where the inter-symbol interference is negligible due to the insertion of a cyclic prefix or a guard interval, the channel from each transmit antenna to each receive antenna is often modeled as a single-tap complex gain. In this case, equation (1) simplifies to $$y_k = H s_k + v, \quad (2)$$

where H is now an $M_r$ by $M_t$ matrix of complex numbers and $HS_k$ is the matrix product of H and S. The receiver must estimate $S_k$ in order to facilitate reliable communication. If v were not present and H were invertible, an estimate of $S_k$ may be achieved by inverting H. However the presence of noise increases the difficulty of estimating $S_k$.

An optimal solution in the sense of minimizing the probability of symbol error has been shown to be the maximum likelihood (ML) decoder. The ML decoder attempts to find the symbol vector $s_k$ sent at burst k, by using the symbol vector $\{\tilde{s}\}_k$ that maximizes $p(\{\tilde{s}\}_k | y_1 \ldots Y_k)$, where $p(\cdot | y_1 \ldots y_k)$ is the conditional probability density function of $s_k$ given $y_1 \ldots y_k$. However, in real-time communications systems the ML decoder is overly computationally complex. The ML decoder requires $O(N_s^{M_t}) = O(2^{NM_t})$ computations of the conditional probability density function to decode to the optimal symbol vector, where N is the number of bits per symbol, $N_s$ is the constellation size and $M_t$ is the number of transmit channels. O "means on the order of." For a better understanding of ML decoders, see U.S. Pat. No. 4,823,346 to Kobayashi, et al., entitled "Maximum Likelihood Decoder," which is incorporated herein by reference.

As an alternative, suboptimal decoder techniques are typically less computationally complex to employ. However, they differ in diversity order (i.e., the asymptotic slope of the average probability of bit error curve) from ML decoding. Since they essentially trade reduced complexity for reduced performance, they increase their probability of symbol error compared to the ML decoder. For a better understanding of suboptimal decoders and their operation, see Madkour, et al., "Successive Interference Cancellation Algorithms for Downlink W-CDMA Communications", IEEE Transactions on Wireless Communications, Volume 1, Number 1, January, 2002, which is incorporated herein by reference.

Accordingly, what is needed in the art is a way to decode symbols that is less computationally burdensome than ML decoding, but more closely approximates ML decoding than conventional suboptimal techniques.

SUMMARY OF THE INVENTION

To address the above-discussed deficiencies of the prior art, the present invention is directed to a greater likelihood decoder, a method of deriving a reduced substreams maximum likelihood (RSML) decoded symbol vector and a MIMO receiver incorporating the decoder or the method. In one embodiment, the greater likelihood decoder includes a suboptimal decoder configured to analyze a received symbol vector to generate substream indicators and a decoded symbol vector estimate. The greater likelihood decoder also includes weakest substreams decision logic, coupled to the suboptimal decoder, configured to receive the substream indicators and select weakest ones thereof. The greater likelihood decoder further includes subspace search logic, coupled to the suboptimal decoder and the weakest substreams decision logic, configured to further select the RSML decoded symbol vector from a subspace of decoded symbol vector candidates derived from the decoded symbol vector estimate and the weakest ones.

In another aspect, the present invention provides a method of deriving a reduced substreams maximum likelihood (RSML) decoded symbol vector. In one embodiment, the method includes analyzing a received symbol vector to generate substream indicators and a decoded symbol vector estimate, selecting weakest ones of the substream indicators and further selecting the RSML decoded symbol vector from a subspace of decoded symbol vector candidates derived from the decoded symbol vector estimate and the weakest ones.

The present invention also provides, in yet another aspect, a MIMO receiver. In one embodiment, the MIMO receiver includes a plurality of receive channels, and a greater likelihood decoder. The greater likelihood decoder includes a suboptimal decoder that analyzes a received symbol vector to generate substream indicators and a decoded symbol vector estimate. The greater likelihood decoder also includes weakest substreams decision logic, coupled to the suboptimal decoder, that receives the substream indicators and selects weakest ones thereof. The greater likelihood decoder further includes subspace search logic, coupled to the suboptimal decoder and the weakest substreams decision logic, that further selects a reduced substreams maximum likelihood (RSML) decoded symbol vector from a subspace of decoded symbol vector candidates derived from the decoded symbol vector estimate and the weakest ones.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
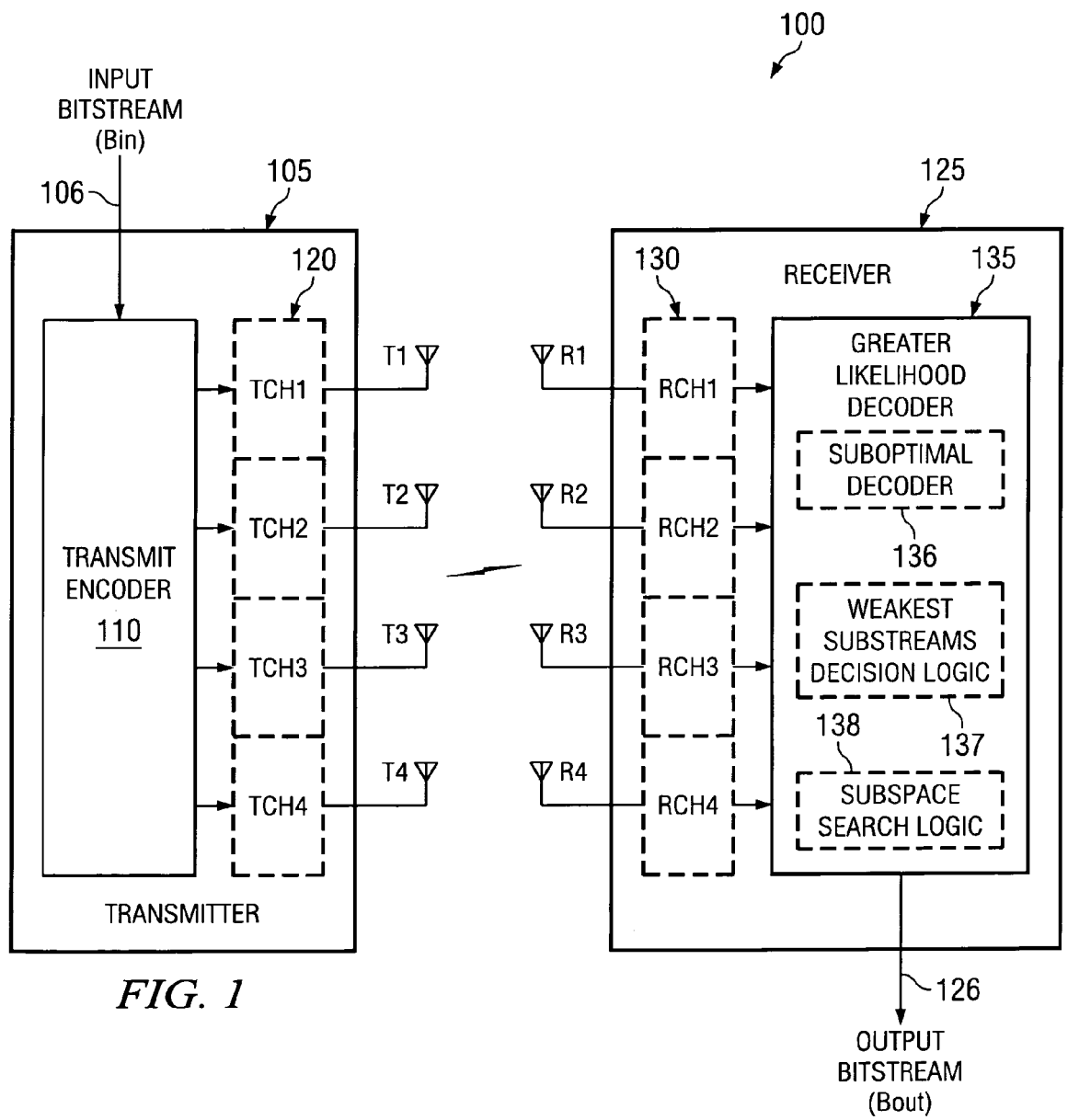
FIG. 1 illustrates an embodiment of a four by four multiple-input multiple output (MIMO) communication system constructed according to the principles of the present invention.

Referring initially to FIG. 1, illustrated is an embodiment of a four by four multiple-input, multiple output (MIMO) communication system, generally designated 100, constructed according to the principles of the present invention. The MIMO communication system 100 includes a MIMO transmitter 105 and a MIMO receiver 125. The MIMO transmitter 105 includes a transmit input 106 having an input bitstream Bin, a transmit encoder 110 and a transmit system 120 having first, second, third and fourth transmit channels TCH1, TCH2, TCH3, TCH4 that are coupled to first, second, third and fourth transmit antennas T1, T2, T3, T4, respectively. The MIMO receiver 125 includes a receive system 130 having first, second, third and fourth receive antennas R1, R2, R3, R4 that are respectively coupled to first, second, third and fourth receive channels RCH1, RCH2, RCH3, RCH4, and a greater likelihood decoder 135 having a receive output 126 that provides an output bitstream Bout.

The illustrated embodiment of FIG. 1 represents only one example of numerous MIMO communication systems that may employ the principles of the present invention. Additionally, in the illustrated and alternative embodiments of the present invention, these numerous MIMO communication systems may form at least a portion of a narrowband communication system employing multiple antennas, a broadband communication system employing OFDM, a time division multiple access (TDMA) communication system or a multiuser communication system.

The transmit encoder 110 encodes the input bitstream Bin into vector symbols for presentation to the transmit channels TCH1-TCH4. The transmit channels TCH1-TCH4 include the frequency tuning, modulation and power amplification circuitry required to condition and transmit the transmit substreams TS1-TS4. Similarly, the receive channels RCH1-RCH4 contain the required capture, detection and recovery circuitry to allow processing of the receive substreams RS1-RS4 into a symbol configuration that may be employed by the greater likelihood decoder 135. The greater likelihood decoder 135 decodes the receive substreams RS1-RS4 into the output bitstream Bout that is representative of the input bitstream Bin. The MIMO receiver 125 has an estimate of the matrix of complex gains H available to it. Additionally, the symbol vectors $s_k$ are assumed to be chosen from a finite set C of possible symbol vectors. In an alternative embodiment, the greater likelihood decoder 135 may be implemented as an additional stage to an existing suboptimal decoder.

The greater likelihood decoder 135 includes a suboptimal decoder 136, weakest substreams decision logic 137 and subspace search logic 138. The suboptimal decoder 136 analyzes a received symbol vector to generate substream indicators for all of the substreams and a decoded symbol vector estimate. The weakest substreams decision logic 137, which is coupled to the suboptimal decoder 136, receives these substream indicators and selects a reduced number of substreams corresponding those having substream indicators that are the weakest. The subspace search logic 138, which is coupled to the suboptimal decoder 136 and the weakest substreams decision logic 137, further selects a reduced substreams maximum likelihood (RSML) decoded symbol vector from a decoded symbol vector candidates subspace that is derived from the decoded symbol vector estimate and the selected weakest substream indicators.

Since the selected number of weakest substreams is typically less than the number of transmit channels, the number of symbol vector comparisons may be reduced from $N_s^{M_t}$ to $N_s^L$, where N is the number of bits per symbol, $N_s$ is the constellation size, $M_t$ is the number of transmit channels and L is the selected number of weakest substreams. The size of the subspace may then be a function of a programmable number, which provides performance that lies between ML decoding and iterative minimum mean squared error (IMMSE) decoding.

In one embodiment of the present invention, the selected number of weakest substreams L may be fixed for all symbols. In an alternative embodiment, the selected number of weakest substreams L may be fixed initially and then allowed to change from symbol to symbol. In another embodiment, the selected number of weakest substreams L may be adaptively determined through a training process on the receive signal and then fixed for all symbols. In yet another embodiment, the selected number of weakest substreams L may be allowed to adaptively change from symbol to symbol.

The selection of each of these embodiments may depend on the substream indicators employed. The substream indicators may be preprocessing signal-to-noise ratios or an improvement in post-processing signal-to-noise ratios. Alternatively, the substream indicators may be based on a signal strength attribute related to signal amplitude or power. Additionally, the substream indicators may be based on a probably of error associated with the substreams. Total available computation resources or overall power considerations may also form a basis for the substream indicators employed. Of course, a combination of one or more of these criterion as well as other current or future-developed criterion may be employed individually or collectively for the selected number of weakest substreams L, as appropriate to a specific application.

In one embodiment of the present invention, the actual substreams selected to be in the number of weakest substreams L may be fixed based on a priori or a posteriori knowledge. In an alternative embodiment, the actual substreams selected may be fixed initially and then allowed to change from symbol to symbol. In another embodiment, the actual substreams may be determined once during reception and fixed for all symbols. In yet another embodiment, the actual substreams may be changed from symbol to symbol. The choice of which subset of substreams to use may also be arbitrary. Alternatively, the choice may be based on a signal-to-noise ratio, a signal strength attribute, a signal error probability or a threshold appropriate to the substreams. Computational resources or power considerations may impact the choice. Of course, a combination of one or more of these criterion, as well as other current or future-developed criterion, may be employed in the selection of the actual substreams, either individually or collectively.

An advantage of employing the greater likelihood decoder 135, to provide a reduced substreams maximum likelihood (RSML) decoded symbol vector, include allowing an adjustable search space whose size may be determined by varying the selected number of weakest substreams L as well as which of the total number of substreams that are actually employed. This adjustable search space allows tradeoffs between system complexity and performance to be established and provides an average probability of error performance that lies between IMMSE decoding and ML decoding.

Figure 2:
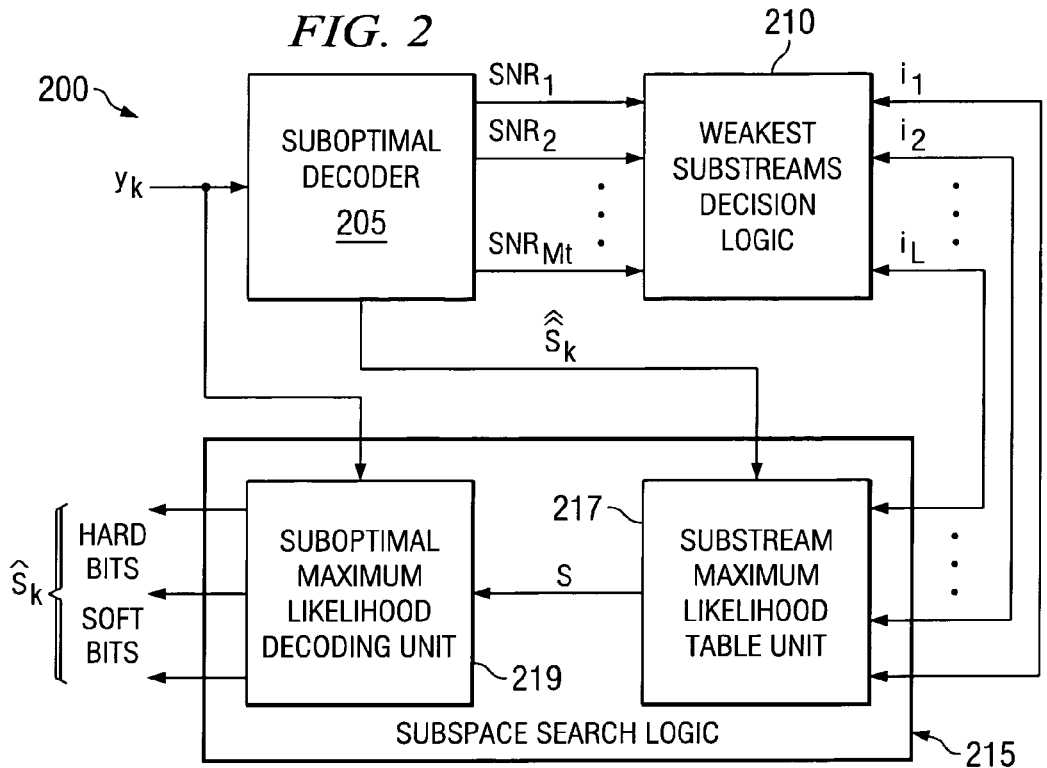
FIG. 2 illustrates a block diagram of an embodiment of a greater likelihood decoder constructed according to the principles of the present invention.

Turning now to FIG. 2, illustrated is a block diagram of an embodiment of a greater likelihood decoder, generally designated 200, constructed according to the principles of the present invention. The greater likelihood decoder 200 includes a suboptimal decoder 205, weakest substreams decision logic 210 and subspace search logic 215 employing an substream maximum likelihood table unit 217 and a suboptimal maximum likelihood decoding unit 219.

The greater likelihood decoder 200 provides performance that is between suboptimal and ML decoding with only a small complexity increase over suboptimal decoding. The greater likelihood decoder 200 employs the suboptimal decoder 205 to analyze a received symbol vector $y_k$ and to generate a collection of substream indicators $SNR_1$-$SNR_{Mt}$ which are signal-to-noise ratios. In the illustrated embodiment, the suboptimal decoder 205 is configured to select from the group consisting of an ordered IMMSE decoder and a zero-forcing decoder. Of course, other embodiments of the present invention may employ ordered zero-forcing or minimum mean squared error (MMSE) as well as other current or future developed interference cancellation techniques. The only requirement imposed on the suboptimal decoder 205 is that it compute the signal-to-noise ratio on each receive substream, in the illustrated embodiment. The suboptimal decoder 205 also provides a decoded symbol vector estimate $$\hat{s}_k$$

to the Substream maximum likelihood table unit 217.

The greater likelihood decoder 200 also includes a weakest substreams decision logic 210, which receives the substream indicators $SNR_1$-$SNR_{Mt}$ and selects a quantity of L weakest substream indexes $i_1$-$i_L$, thereof. The weakest substreams decision logic 210 may employ either a fixed or an adaptable L corresponding to an adaptable substream search size. The adaptation of L may occur from symbol to symbol, from frame to frame or from receive period to receive period, where the receive period may be arbitrarily defined. Additionally, a subset of the possible $N_s^L$ vectors in the weakest substreams may be employed.

The greater likelihood decoder 200 further includes subspace search logic 215, coupled to the suboptimal decoder 205 and the weakest substreams decision logic 210, that further selects a reduced substreams maximum likelihood (RSML) decoded symbol vector $\hat{s}_k$ from a reduced search space S of decoded symbol vector candidates derived from the decoded symbol vector estimate $$\hat{s}_k$$

and the weakest substream indexes $i_1$-$i_L$.

The weakest substream indexes, $i_1, i_2, \ldots, i_L$, and the suboptimal decoders hard estimate of the decoded symbol vector are provided to the substream maximum likelihood table unit 217. In this unit, the reduced search space S, $S \subseteq C$, of $N_s^L$ symbol vectors is created. The reduced search space S is created by replacing the decoded symbols at indexes $i_1$, $i_2, \ldots, i_L$ in $\hat{s}_{ki}$ with each of the $N_s^L$ possible symbol combinations that could occur in the L indexes (changing symbols of the decoded symbol vector estimate corresponding to the weakest ones). This reduced search space S is provided to the suboptimal maximum likelihood decoding unit 219 that returns the RSML decoded symbol vector $\hat{s}_k \in S$ such that $$\hat{s}_k = \arg\max_{v \in S} \|y_k - Hv\|_2, \quad (3)$$

which amounts to a difference between the received symbol vector and substream gained noise. In the illustrated embodiment, $\hat{s}_k$ includes both hard and soft bits corresponding to $Q(\hat{s}_k)$, where Q represents a symbol slicing function, which slices both single symbols and multi-dimensional symbol vectors.

Figure 3:
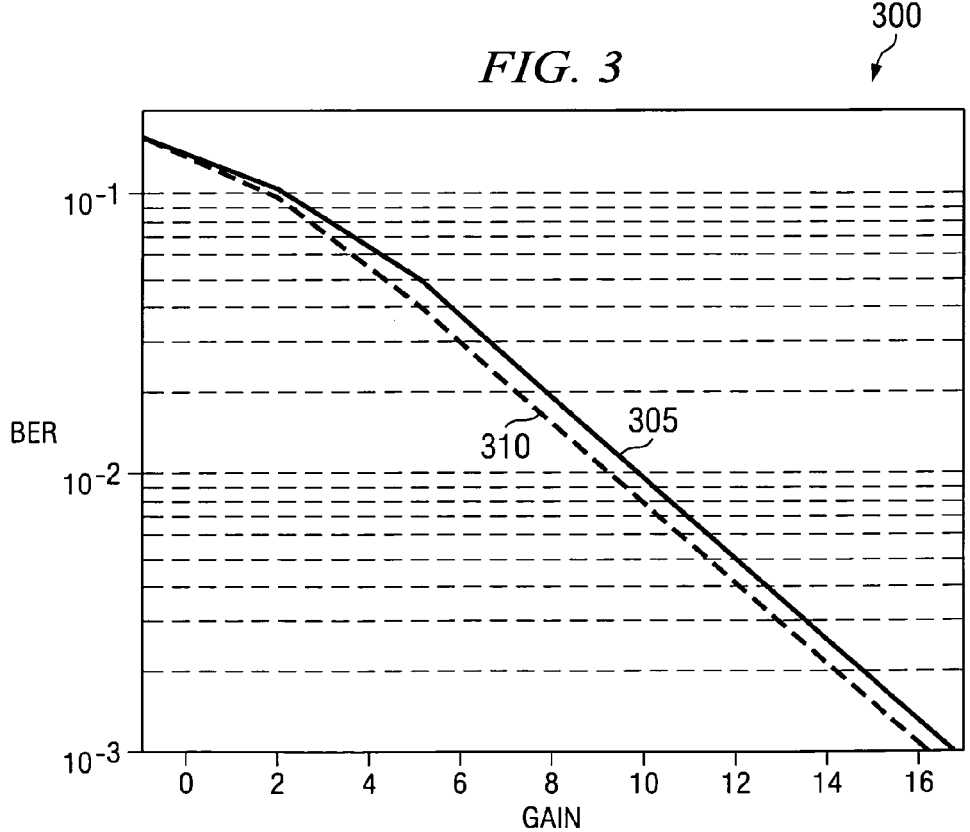
FIG. 3 illustrates a graph showing a bit error rate (BER) comparison between an embodiment of a greater likelihood decoder and method constructed and carried out according to the principles of the present invention and an alternative IMMSE decoder.

Turning now to FIG. 3, illustrated is a graph, generally designated 300, showing a bit error rate (BER) comparison between an embodiment of a greater likelihood decoder and method constructed and carried out according to the principles of the present invention and an alternative IMMSE decoder. The graph 300 includes a first curve 305 representing the BER of the greater likelihood decoder, and a second curve 310 representing the BER of the alternative IMMSE decoder. A four by four MIMO communication system using a three substream search size and 16-QAM was employed. In the graph 300, the greater likelihood decoder is the equivalent of reducing the ML search set by one-half. This concatenated, reduced search space decoder provides approximately a 0.75 dB improvement over ordered IMMSE decoding.

In summary, embodiments of the present invention have been presented employing a greater likelihood decoder, a method of deriving a reduced substreams maximum likelihood (RSML) decoded symbol vector and a MIMO receiver incorporating the decoder or the method. A reduced search space maximum likelihood decoding algorithm, allowing a search space to be created by searching over a fixed number of receive substreams, has been presented. The decoder and method provide average probability of error performance between IMMSE decoding and ML decoding. The sub-ML method allows a system designer to make tradeoffs between complexity and performance by adjusting the search space size.

Although the present invention has been described in detail, those skilled in the art should understand that they can make various changes, substitutions and alterations herein without departing from the spirit and scope of the invention in its broadest form.

What is claimed is:

1. A greater likelihood decoder, comprising:
   a suboptimal decoder configured to analyze a received symbol vector to generate substream indicators and a decoded symbol vector estimate;
   weakest substreams decision logic, coupled to said suboptimal decoder, configured to receive said substream indicators and select weakest ones thereof; and
   subspace search logic, coupled to said suboptimal decoder and said weakest substreams decision logic, configured to further select a reduced substreams maximum likelihood (RSML) decoded symbol vector from a subspace of decoded symbol vector candidates derived from said decoded symbol vector estimate and said weakest ones.

2. The decoder as recited in claim 1 wherein said suboptimal decoder is configured to select from the group consisting of:
   an ordered iterative minimum mean-squared error decoder, and
   a zero-forcing decoder.

3. The decoder as recited in claim 1 wherein said substream indicators are selected from the group consisting of:
   a signal-to-noise ratio,
   a signal strength attribute, and
   a signal error probability.

4. The decoder as recited in claim 1 wherein said weakest substreams decision logic is configured to select a programmable number of said weakest ones, a size of said subspace being a function of said programmable number.

5. The decoder as recited in claim 1 wherein said subspace search logic is configured to create said subspace by changing symbols of said decoded symbol vector estimate corresponding to said weakest ones.

6. The decoder as recited in claim 1 wherein said subspace search logic is configured to further select said RSML decoded symbol vector based on a difference between said received symbol vector and substream gained noise.

7. The decoder as recited in claim 1 wherein said subspace search logic is configured to generate hard and soft bits for said RSML decoded symbol vector.

8. A method of deriving a reduced substreams maximum likelihood (RSML) decoded symbol vector, comprising:
   analyzing a received symbol vector to generate substream indicators and a decoded symbol vector estimate;
   selecting weakest ones of said substream indicators; and
   further selecting a reduced substreams maximum likelihood (RSML) decoded symbol vector from a subspace of decoded symbol vector candidates derived from said decoded symbol vector estimate and said weakest ones.

9. The method as recited in claim 8 wherein said analyzing is carried out by a suboptimal decoder selected from the group consisting of:
   an ordered iterative minimum mean-squared error decoder, and
   a zero-forcing decoder.

10. The method as recited in claim 8 wherein said substream indicators are selected from the group consisting of:
    a signal-to-noise ratio,
    a signal strength attribute, and
    a signal error probability.

11. The method as recited in claim 8 wherein said selecting comprises selecting a programmable number of said weakest ones, a size of said subspace being a function of said programmable number.

12. The method as recited in claim 8 wherein said further selecting comprises creating said subspace by changing symbols of said decoded symbol vector estimate corresponding to said weakest ones.

13. The method as recited in claim 8 wherein said further selecting comprises selecting said RSML decoded symbol vector based on a difference between said received symbol vector and substream gained noise.

14. The method as recited in claim 8 wherein said further selecting comprises generating hard and soft bits for said RSML decoded symbol vector.

15. A multiple-input, multiple-output (MIMO) receiver, comprising:
    a plurality of receive channels; and
    a greater likelihood decoder, including:
       a suboptimal decoder that analyzes a received symbol vector to generate substream indicators and a decoded symbol vector estimate,
       weakest substreams decision logic, coupled to said suboptimal decoder, that receives said substream indicators and selects weakest ones thereof, and
       subspace search logic, coupled to said suboptimal decoder and said weakest substreams decision logic, that further selects a reduced substreams maximum likelihood (RSML) decoded symbol vector from a subspace of decoded symbol vector candidates derived from said decoded symbol vector estimate and said weakest ones.

16. The receiver as recited in claim 15 wherein said suboptimal decoder is selected from the group consisting of:
    an ordered iterative minimum mean-squared error decoder, and
    a zero-forcing decoder.

17. The receiver as recited in claim 15 wherein said substream indicators are selected from the group consisting of:
    a signal-to-noise ratio,
    a signal strength attribute, and
    a signal error probability.

18. The receiver as recited in claim 15 wherein said weakest substreams decision logic selects a programmable number of said weakest ones, a size of said subspace being a function of said programmable number.

19. The receiver as recited in claim 15 wherein said subspace search logic creates said subspace by changing symbols of said decoded symbol vector estimate corresponding to said weakest ones.

20. The receiver as recited in claim 15 wherein said subspace search logic further selects said RSML decoded symbol vector based on a difference between said received symbol vector and substream gained noise.

21. The receiver as recited in claim 15 wherein said subspace search logic generates hard and soft bits for said RSML decoded symbol vector.

* * * * *